May 29, 1962 J. K. CLARK 3,037,107
BRACKET ASSEMBLY FOR THERMOSTATIC COOKWARE
Filed Aug. 26, 1960

INVENTOR.
JESSE K. CLARK
BY
Lindsey, Prutzman and Hayes
ATTORNEYS

United States Patent Office 3,037,107
Patented May 29, 1962

3,037,107
BRACKET ASSEMBLY FOR THERMOSTATIC COOKWARE
Jesse K. Clark, Newington, Conn., assignor to Landers, Frary & Clark, New Britain, Conn., a corporation of Connecticut
Filed Aug. 26, 1960, Ser. No. 52,186
3 Claims. (Cl. 219—44)

The present invention relates generally to cooking appliances of the electrically heated, thermostatically controlled type and is more particularly concerned with the provision of such an appliance having an improved terminal socket construction for a detachable thermostatic control.

Among the objects of this invention is the provision of an improved bracket assembly for cookware of the detachable thermostat type which simplifies power terminal mounting, establishes proper thermostat socket-power terminal spacing, and reduces unwanted heat transfer thereby to greatly reduce the manufacturing cost of the appliance while increasing its durability, accuracy and dependability.

Other objects will be in part obvious and in part pointed out more in detail hereinafter.

The invention accordingly consists in the features of construction, combination of elements and arrangement of parts which will be exemplified in the construction hereafter set forth and the scope of the invention which will be indicated in the appended claims.

Figure 2:
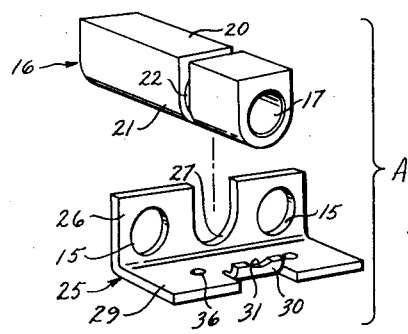
FIG. 2 is a perspective view of the probe key and bracket assembly shown in FIG. 1 and exploded to show their structural relationship prior to assembly.
Figure 3:
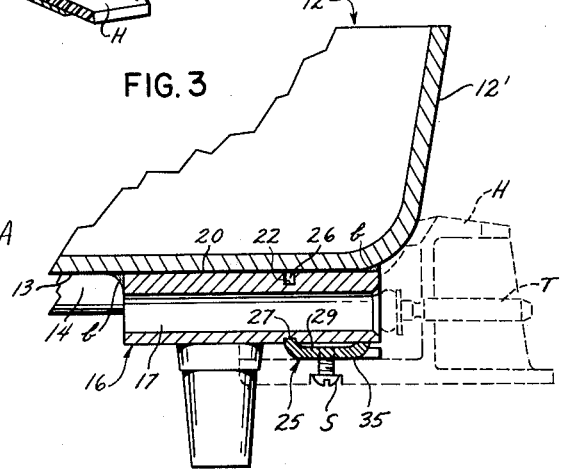
FIG. 3 is a sectional view of the frying pan and assembly of FIG. 1 taken along the longitudinal center line of the probe key and showing the terminal guard and heating element terminal in phantom.
Figure 4:
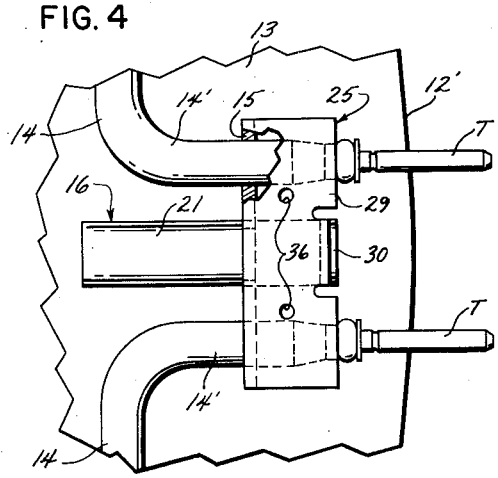
FIG. 4 is a fragmentary bottom view of the frying pan and bracket assembly of FIG. 1 partially broken away and showing the assembly with the terminal guard removed.

In the figures there is shown an electric frying pan 10 supported by corner legs 11 and forming a container 12 which is heated at its under surface 13 by a tubular heating element 14. The heating element 14 is secured to the undersurface 13 by brazing (not shown), or otherwise, and extends in a circular pattern (not shown) substantially centrally of the under surface area. The ends 14' of the heating element 14 extend outwardly and slightly downwardly, as best seen in FIGS. 3 and 4, adjacent one of the walls 12' of the container 12 where they extend through a pair of terminal holes 15 in the key and bracket assembly A (FIG. 2) which is secured, as by brazing, to the container under surface 13. The heating element ends 14' are thereby vertically spaced beneath the container under surface 13 and are spaced relative to each other in accordance with the spacing of holes 15. A pair of outwardly extending terminal studs T which are received in the socket of a detachable thermostat and electric power plug (not shown) are attached to the outer ends of the heating element.

The probe key 16 of the key and bracket assembly A serves to transfer heat from the pan 10 to the thermostatic control (not shown). As best seen in FIGS. 2 and 3, key 16 is elongated and provided with a flat upper surface 20 which abuts the container under surface 13 in heat exchange relationship therewith and with a central longitudinally extending chamber 17, opened at its ends to receive the heat-sensing probe of the thermostatic control which normally extends between the electric power terminals of the detachable plug. The outer surfaces of the key 16 extend downwardly from the side edges of the flat upper surface 20 and form an arcuate under surface 21 at the lower portions of the key 16. A circular groove 22, concentric with the axis of the probe chamber 17 is provided in the key 16 intermediate its ends.

The bracket 25 of assembly A is L-shaped in cross section and provides a vertically extending leg 26 with a centrally disposed U-shaped cutout portion 27, the edges of which are dimensioned for mating with the lower portions of the circular groove 22 of the probe key 16. The vertical leg 26 is formed with the pair of terminal holes 15 disposed on either side of and equidistantly spaced from the U-shaped cutout portion 27. These holes 15 are dimensioned so that their circular edges receive the ends 14' of the heating unit 14 in a snug fit (FIG. 4) and thereby retain them in their proper spaced relation with one another and with the probe key 16 disposed between them.

The horizontal leg 29 of the L-shaped bracket 25 extends forwardly to provide a centrally disposed upturned lip 30 having a centrally disposed U-shaped or arcuate cutout portion 31 formed in the upper end thereof. The edges of this cutout portion 31 are dimensioned to receive the arcuate under surface 21 at the forward end of the probe key 16 and to positively position the leg 29 of bracket 25 relative to the probe key 16 during assembly.

To assemble the bracket 25 and key 16, the edges of the U-shaped cutout portion 27 are mated in the groove 22 of the probe key 16 with the forward end of the key disposed upon the U-shaped cutout portion 31 of the bracket lip 30. The key 16 and bracket 25 are then secured together, as by brazing, at the key-lip connection and at the key-vertical leg connection. When so mated and secured, the upper edges of the vertical leg 26 extend in a horizontal plane common with the flat upper surface 20 of the probe key 16 so that the bracket 25 and the key 16 may both abut the under surface 13 of the container 12 (FIG. 3).

As the terminal holes 15 are equally spaced on opposite sides of U-shaped cutout portion 27, the critical positioning of the ends 14' of the heating element 14 and the heat transfer element, or key 16, is achieved by merely positioning the terminal holes 15 of the key and bracket assembly A over the ends 14' of the heating element 14, as illustrated in FIG. 4. A simple brazing operation will then secure the upper edges of the bracket 25 to the container under surface 13 and to the heating element ends 14'. Additionally, the upper surface 20 of key 16 is secured in intermediate heat conducting relationship to surface 13 by end brazing, as shown at b in FIG. 3.

Figure 1:
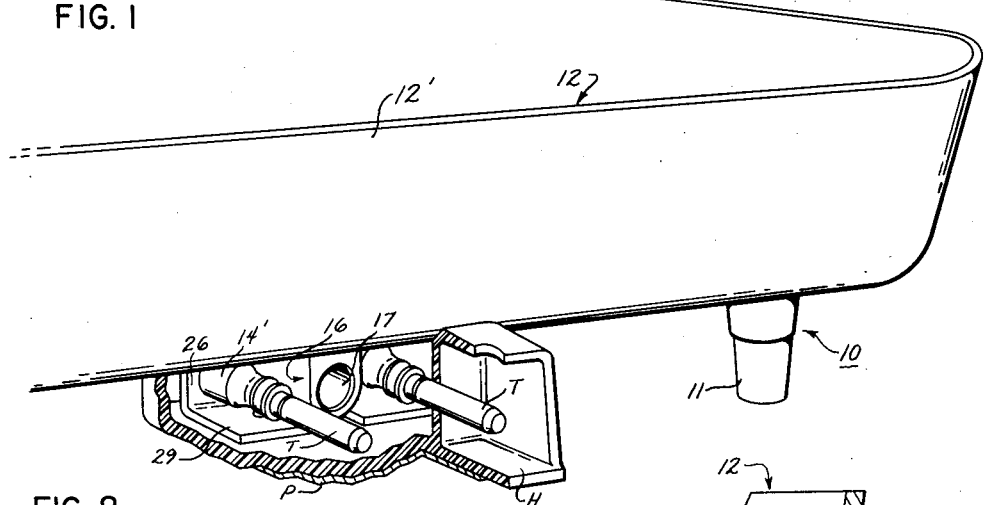
FIG. 1 is a perspective view of an electric frying pan incorporating a preferred embodiment of the present invention and showing portions of a guard for the electric terminals broken away.

Provision is made in the bracket 25 for mounting a terminal stud guard or housing H shown in FIGS. 1 and 3. The guard H is an electric and heat insulator and surrounds the terminals 15 of the heating element 14. It is apertured conveniently (not shown) to accommodate the terminal studs T and thermostatic control probe. A stabilizer and securing plate P (shown in FIG. 1 only) underlies the housing and a pair of screws S join the plate P and guard H to the under surface 35 of the bracket 25 where the screws S are secured in threaded holes 36 in the horizontal leg 29, one on either side of the lip 30.

It is now seen that this invention provides an improved bracket assembly that easily and accurately positions and retains the probe key and power terminals of a thermostatically controlled appliance of the detachable thermostat type. Additionally, this bracket substantially increases the efficiency and reliability of the appliance by minimizing, through edge contact with the heated members, unwanted heat loss, while insuring proper location of the probe key relative to the heating element and providing a mounting place for decorative and protective housing members. Through use of this economically manufactured bracket assembly the appliance can be assembled by relatively unskilled workers so as to further reduce the cost of the appliance.

As will be apparent to persons skilled in the art, various modifications and adaptations of the structure above described will become readily apparent without departure from the spirit and scope of the invention, the scope of which is defined in the appended claims.

I claim:

1. In an electric cooking appliance of the type having an electric heating element, and a detachable electric power source and temperature-sensing element of a thermostatic control; a bracket assembly comprising, an elongated probe key apertured to receive the heat-sensing element of the thermostatic control and having a peripheral groove formed therein, said key being formed with a flat surface and secured therealong to the appliance in heat conducting relationship therewith, and a bracket for positioning said key relative to the ends of the heating element of the appliance and secured to said key, said bracket providing an appliance contact edge and secured to the appliance therealong, a cutout portion centrally disposed in said bracket, the edges defining said cutout portion being received within said groove, a pair of apertures in said bracket, the edges defining said apertures closely engaging the heating element ends and being spaced equidistantly on either side of said cutout portion, said contact edge of said bracket lying in a plane common with the flat surface of said probe key.

2. In an electric cooking appliance of the type having an electric heating element, and a detachable electric power source and temperature-sensing element of a thermostatic control, a bracket assembly comprising, an elongated key probe apertured to receive the heat-sensing element of the thermostatic control and having a peripheral groove formed therein, said key being formed with a flat surface and secured therealong to the appliance in heat conducting relationship therewith, and a bracket for positioning said key relative to the ends of the heating element of the appliance and secured to said key, said bracket being L-shaped in cross section and having a first leg providing an appliance contact edge and secured therealong to the appliance, a cutout portion centrally disposed in said first leg, the edges defining said cutout portion being received within said groove, a pair of apertures in said first leg, the edges defining said apertures closely engaging the heating element ends and being spaced equidistantly on either side of said cutout portion, said bracket having a second leg in underlying engagement with said probe key at a point spaced from the groove, said contact edge of said first leg lying in a plane common with the flat surface of said probe key, a terminal guard housing surrounding said bracket assembly, and means on said second leg securing said terminal guard housing thereto.

3. In an electric cooking appliance of the type having an electric heating element, and a detachable electric power source and temperature-sensing element of a thermostatic control; a heat transfer element and a bracket, said heat transfer element being elongated and formed with a flat upper surface and secured therealong to the under surface of the appliance in heat-conducting relationship therewith, said heat transfer element being formed with an arcuate under surface, and a circular groove on the heat transfer element, said circular groove being disposed intermediate the ends and transverse to the longitudinal center line of said heat transfer element, said bracket being secured to said heat transfer element and comprising an L-shaped member formed with a U-shaped cutout portion centrally disposed in the vertical leg thereof, a pair of apertures in said vertical leg and disposed one on either side of said U-shaped cutout portion and spaced equidistantly therefrom, an upturned lip centrally disposed at the outer edge of the horizontal leg of said L-shaped bracket member, said lip being formed with an arcuate cutout portion centrally thereof, the edges of said U-shaped cutout portion being received in said groove, the edges of said apertures closely engaging the heating element ends, the edges of said arcuate cutout portion in said upturned lip being in underlying engagement with said arcuate under surface, the upper edges of said vertical leg on either side of said U-shaped cutout portion being secured to the under surface of the appliance and extending in a plane common with said upper flat surface of said heat transfer element, a terminal guard housing surrounding the electric terminals of the heating element, means on said horizontal leg attaching said housing thereto.

References Cited in the file of this patent

UNITED STATES PATENTS

| 2,926,230 | Foster | Feb. 23, 1960 |
| 2,938,990 | Levine | May 31, 1960 |

FOREIGN PATENTS

| 1,225,113 | France | Feb. 15, 1960 |